US008244261B2

(12) United States Patent
Choi et al.

(10) Patent No.: US 8,244,261 B2
(45) Date of Patent: Aug. 14, 2012

(54) APPARATUS AND METHOD FOR MANAGING RADIO RESOURCES IN MOBILE COMMUNICATION SYSTEM

(75) Inventors: Sung-gu Choi, Daejeon-si (KR); Yeon-seung Shin, Daejeon-si (KR); Yeong-jin Kim, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 325 days.

(21) Appl. No.: 12/626,888

(22) Filed: Nov. 28, 2009

(65) Prior Publication Data

US 2010/0151872 A1  Jun. 17, 2010

(30) Foreign Application Priority Data

Dec. 17, 2008  (KR) .................. 10-2008-0128532

(51) Int. Cl.
 *H04W 72/00* (2009.01)
 *H04L 1/00* (2006.01)
(52) U.S. Cl. ............ 455/450; 455/452.2; 370/229; 370/230
(58) Field of Classification Search .......... 370/229, 370/230; 455/450, 452.2
See application file for complete search history.

(56) References Cited

U.S. PATENT DOCUMENTS

| 7,174,166 B2 | 2/2007 | Song et al. | |
| 2004/0203450 A1* | 10/2004 | Cho | 455/67.11 |
| 2006/0198304 A1* | 9/2006 | Matefi et al. | 370/230 |

FOREIGN PATENT DOCUMENTS

| KR | 10-2004-0056980 A | 7/2004 |
| KR | 10-2008-0052156 A | 11/2008 |

OTHER PUBLICATIONS

A QoS Framework for Heterogeneous Wireless Networks using a Multiagent System, by Mantilla et al., Department of Electronics, Computer Science and Automatic Control, Girona University, Spain.

* cited by examiner

*Primary Examiner* — Kamran Afshar
*Assistant Examiner* — Omoniyi Obayanju
(74) *Attorney, Agent, or Firm* — Kile Park Goekjian Reed & McManus PLLC

(57) ABSTRACT

Disclosed are an apparatus and a method for managing radio resources, capable of effectively managing radio resources. When a normal call and a handover call are attempted, radio resources are allocated and it is determined whether or not to perform an overload control based on received load related information and then it is determined whether or not to admit the call depending on an availability of a bandwidth for radio resources, a priority of real time traffic or a locking probability of data. The quality and efficiency of a mobile communication service is enhanced by pertaining an effective allocation on radio resources and controlling the load of radio resources in the mobile communication system. The radio resource managing apparatus and method using the same are applied to IMT (International Mobile Telecommunications)-Advanced system base station, thereby optimizing the efficiency of radio resources.

4 Claims, 3 Drawing Sheets

APPARATUS AND METHOD FOR MANAGING RADIO RESOURCES IN MOBILE COMMUNICATION SYSTEM

CROSS-REFERENCE TO RELATED APPLICATION

This application claims the benefit under 35 U.S.C. §119(a) of Korean Patent Application No. 10-2008-0128532, filed on Dec. 17, 2008, the disclosure of which is incorporated by reference in its entirety for all purposes.

BACKGROUND

1. Field

The following description relates to a radio resource management technology in a mobile communication system, capable of effectively allocating radio resources while managing the radio resources when a normal call or a handover call is attempted.

2. Description of the Related Art

Currently, the $3^{rd}$ Generation Partnership Project (3GPP) mobile communication system is currently competitive due to a superior down link capacity and uplink capacity through a High-Speed Downlink Packet Access (HSDPA). However, in order to provide a mobile communication system capable of being competitive in a quickly developing information communication based society, a new wireless access technology needs to be developed.

In order for the existing 3GPP related technologies to be competitive in the future, a wireless access technology for a next generation mobile communication system needs to be considered as an important issue. Main issues of a next generation mobile communication system IMT (International Mobile Telecommunications)-Advanced include reduced latency, higher user data rates, improved system capacity and coverage, and reduced cost for network providers.

In addition, the next generation mobile communication system is working on an interoperation and a handover with respect to non-3G families such as a WLAN in addition to an interoperation with respect to 3G families. Further, a next generation mobile terminal needs to simultaneously support WLAN and 3G families.

In order to strengthen the competitiveness of such a next generation mobile communication system, radio resource management needs to be effectively performed. In general, the conventional radio resource management is performed regardless of various characteristics of the next mobile communication system and thus the efficiency in use of the radio resources is lowered.

The conventional radio resource management provides the same priority to all of calls regardless of the characteristics of services, and is performed based on reception signal intensity or a speed of a mobile terminal. In such a case, a predetermined radio resource, which exerts the greatest influence on the performance of the mobile communication system is not effectively used, and thus the system performance is extremely hindered. In this regard, studies have been pursued on various kinds of theories such as buffer, priority, fuzzy theory, etc. to achieve efficient radio resource management. However, some of such theories are too simple to enhance the efficiency in management of radio resources, whereas, for example, a radio resource management algorithm based on the fuzzy theory is too complicated, which increases the cost for implementing the radio resource management algorithm. Accordingly, the fuzzy theory can not be applied to a commercial mobile communication system.

SUMMARY

Accordingly, in one aspect, there is provided an apparatus and a method for managing radio resources, capable of enhancing the quality and efficiency of a mobile communication service by performing an effective allocation on radio resources and controlling the load of radio resources in the mobile communication system. In detail, when a normal call and a handover call are attempted, radio resources are allocated and it is determined whether or not to perform an overload control based on received load related information and then it is determined whether or not to admit the call depending on an availability of a bandwidth for radio resources, a priority of real time traffic or a locking probability of data.

In one general aspect, there is provided a radio resource managing apparatus for receiving a normal call request or a handover call request and managing radio resources for processing the normal call request or the handover call request and in a mobile communication system. The radio resource managing apparatus includes a call admission controller to determine whether or not to admit the normal call request or the handover call request depending on whether a Quality of Service (QoS) is guaranteed, traffic is real time traffic, or locking of traffic is possible; and a load controller to allocate the radio resources in response to the normal call request or the handover call request while checking spare radio resources and to provide the call admission controller with information indicating allocable radio resources.

The call admission controller receives the normal call request or the handover call request, transmits the normal call request or the handover call request to the load controller and estimates whether the QoS is guaranteed based on the information indicating the allocable radio resources.

If the QoS is guaranteed, the call admission controller admits the normal call or the handover call, and if the QoS is not guaranteed, the call admission controller determines whether the traffic is real time traffic. If the traffic is real time traffic, the call admission controller requests the load controller to allocate radio resources and estimates whether QoS is guaranteed. If the QoS is guaranteed, the call admission controller admits the normal call or the handover call, and if the QoS is not guaranteed, determines whether traffic locking is possible. If the traffic locking is possible, the call admission controller requests the load controller to allocate radio resources capable of guaranteeing a minimum level of QoS, thereby admitting the normal call or the handover call.

In another general aspect, there is provided a method of managing radio resources in a mobile communication system including a load controller, which allocates the radio resources upon a normal call request or a handover call request and determines whether or not to perform an overload control by using received load relating information, and a call admission controller determining whether or not to admit the normal call request or the handover call request depending on whether a Quality of Service (QoS) is guaranteed on the radio resources allocated by the load controller, traffic is real time traffic and traffic locking is possible. The radio resource managing method is performed as follows. First, if the call admission controller transmits the normal call request or the handover call request to the load controller, the load controller checks spare radio resources and providing information about allocable radio resources to the call admission controller. After that, the call admission controller estimates whether the QoS is guaranteed on the allocable radio resources, wherein if the QoS is guaranteed, the call admission controller admits the normal call or the handover call, and if the QoS is not guaranteed, the call admission controller determines whether the traffic is real time traffic. Then, if the traffic is real time traffic, the call admission controller requests the load controller to allocate radio resources. The load controller checks spare radio resources to provide information about allocable radio resources to the call admission controller. Then, the call admission controller estimates whether QoS is guaranteed based on the allocable radio resources. Then, if the QoS is guaranteed, the call admission controller admits the normal call or the handover call, and if the QoS is not guaranteed, the call admission controller determines whether locking is possible. Finally, if the locking is possible, the call admission controller requests the load controller to allocate radios resources capable of guaranteeing a minimum level of QoS, the load controller allocates the requested radio resources to provide information about the requested radio resources to the call admission controller, and the call admission controller admits the normal call or the handover call based on the information.

When the call admission controller processes the normal call request, the determining of the locking probability includes determining whether locking of non-real time traffic is possible. When the call admission controller processes the handover call request, the determining of the locking probability includes determining whether locking of real-time traffic or non-real time traffic is possible.

Other objects, features and advantages will be apparent from the following description, the drawings, and the claims.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

Figure 1:
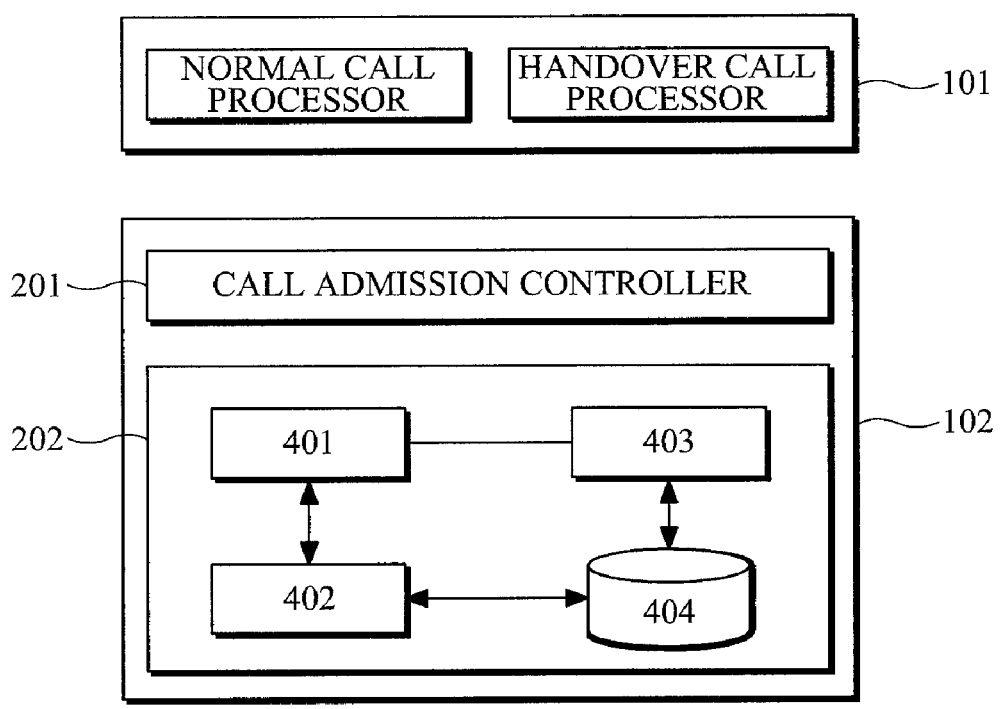
FIG. 1 is a view illustrating an exemplary radio resource management apparatus.

FIG. 1 is a view illustrating an exemplary radio resource management apparatus.

As shown in FIG. 1, a radio resource management apparatus includes a call processor 101 and a resource manager 102. The resource manager 102 includes a call admission controller 201 and a load controller 202.

The call processor 101 controls a normal call or a handover call of a wireless area by controlling a radio signaling protocol. To this end, the call processor 101 is provided with a normal call processor 301 and a handover call processor 302.

The call admission controller 201 determines whether or not to admit a normal call or a handover call requested upon a normal call attempt or a handover call attempt. The load controller 202 allocates radio resources and determines whether or not to perform an overload control based on received load related information.

For example, if the call admission controller 201 receives a call request from the call processor 101 and transmits the call request to the load controller 202, the load controller 202 checks spare radio resources to provide the call admission controller 201 with information about allocable radio resources. The call admission controller 201 admits or rejects the call request by determining whether QoS is guaranteed, traffic is real time traffic and locking is possible based on the information provided from the load controller 202. The locking represents a process of finding a condition ensuring a minimum level of QoS while temporally delaying a service.

The load controller 202 includes an overload controller 401 performing an overload control when the amount of collected load exceeds a predetermined critical value, a load monitor 402 to monitor load of downlink or uplink and deliver load information obtained by the monitoring to the overload controller 401, a resource allocator 403 allocating radio resources and maintaining spare radio resources, and a resource status DB 404 storing various kinds of information on a resource status.

Various kinds of parameters are used to perform a load control operation. The parameters are set as values for optimizing the performance of a system while maintaining a static state or a dynamic state. To this end, a scheme of deriving load controlling parameters suitable for various conditions and applying desirable values to the parameters is required. The load controller 202 performs a load control operation based on values acquired through the load monitor 402 while preventing the quality of the service on real time traffic and non-real time traffic from being lowered. That is, if a load exceeds a predetermined critical value, the load controller 202 performs a load control operation based on received load relating values. In addition, if the load is of a normal level, the load controller 202 continually monitors a corresponding system.

The load controller 202 allocates radio resources to calls in connection with the call admission controller 201. The load controller 202 continually updates the amount of occupied resources, and allocates available resources within a range of spare resources. That is, the load controller 202 maintains or manages available resources through an interface with respect to the call admission controller 201 such that radio resources are allocated upon a call request or a handover call attempt.

The resource status DB 404 performs maintenance/management on the amount of entire resources, the amount of resources being used and the amount of available resources at each base station of cells. That is, the resource status DB 404 performs maintenance/management on the status of overall resources for each base station. The resource status DB 404 manages and maintains a status of resources in a system while a new call is generated and then fades.

Figure 2:
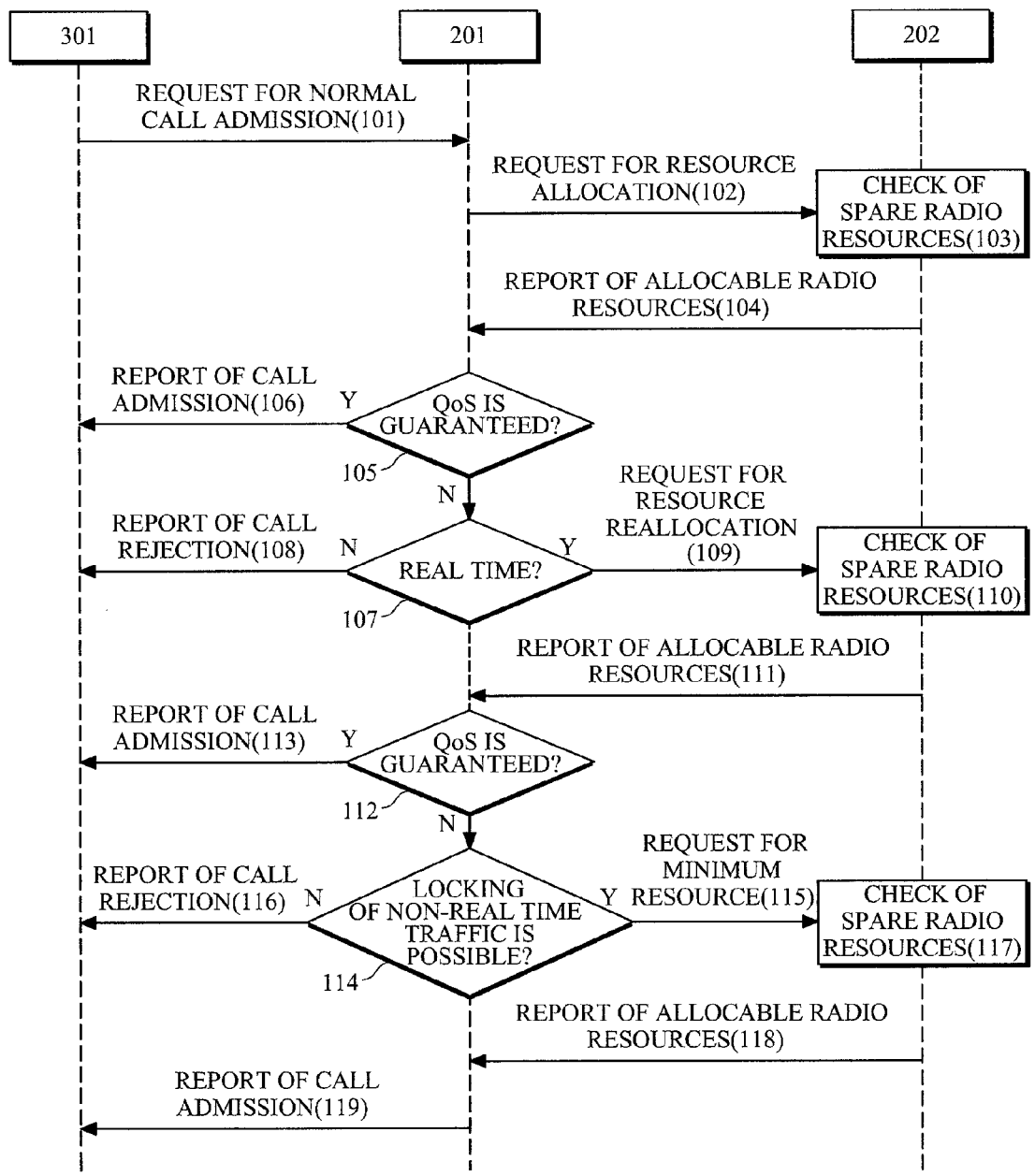
FIG. 2 is a view illustrating an exemplary radio resource management method.

FIG. 2 is a view illustrating an exemplary radio resource management method, in which the exemplary radio resource managing apparatus described above receives a normal call request and then processes the call request while managing radio resources based on the call request.

First, if the normal call processor 301 receives a call attempt request from a mobile terminal, the normal call processor 301 requests the call admission controller 201 to admit a call by using a call type, a call service classification and QoS as parameters such that an access for a wireless area is set (operation 101).

The call admission controller 201 transmits the call admission request to the load controller 202, thereby requesting a resource allocation (operation 102).

The load controller 202 checks a status of spare radio resources in response to the call admission request (operation 103), and provides the call admission controller 201 with information on allocable radio resources (operation 104). For example, the load controller 202 provides the call admission controller 201 with information on a bandwidth available for the resource status.

The call admission controller 201 determines whether QoS is guaranteed based on the information transmitted from the load controller 202 (operation 105). For example, the call admission controller 201 determines whether the bandwidth is suitable for the present resource status.

Upon the result of determination on the QoS, if the QoS is guaranteed, the call admission controller 201 reports a call admission to the normal call processor 301 (operation 106), and if the QoS is not guaranteed, the call admission controller 201 determines whether the traffic is real time traffic (operation 107).

If the traffic is not real time traffic, the call admission controller 201 reports a call rejection to the normal call processor 301 (operation 108). If the traffic is real time traffic, which is sensitive to a time delay, the call admission controller 201 requests the load controller 202 to reallocate radio resources (operation 109).

The load controller 202 checks a status of spare radio resources (operation 110), and provides the call admission controller 201 with information on allocable radio resources (operation 111).

The call admission controller 201 determines whether QoS is guaranteed based on the information on the reallocated radio resources received from the load controller 202 (operation 112).

Upon the result of determination on the QoS, if the QoS is guaranteed, the call admission controller 201 reports a call admission to the normal call processor 301 (operation 113), and if the QoS is not guaranteed, it is determined whether locking is possible (operation 114). The locking represents a process of finding a condition ensuring a minimum level of QoS while temporally delaying a service. For example, the call admission controller 201 determines whether the locking of non-real time traffic is possible. If the locking is not possible, the call admission controller 201 reports a call rejection to the normal call processor 301 (operation 116). If the locking is possible, the call admission controller 201 transmits a request for radio resources guaranteeing a minimum level of QoS to the load controller 202 (operation 115).

The load controller 202 checks spare radio resources in response to the request (operation 117), and provides the call admission controller 201 with information on allocable radio resources (operation 118). As a result, the call admission controller 201 reports a call admission to the normal call processor 301 (operation 119).

Figure 3:
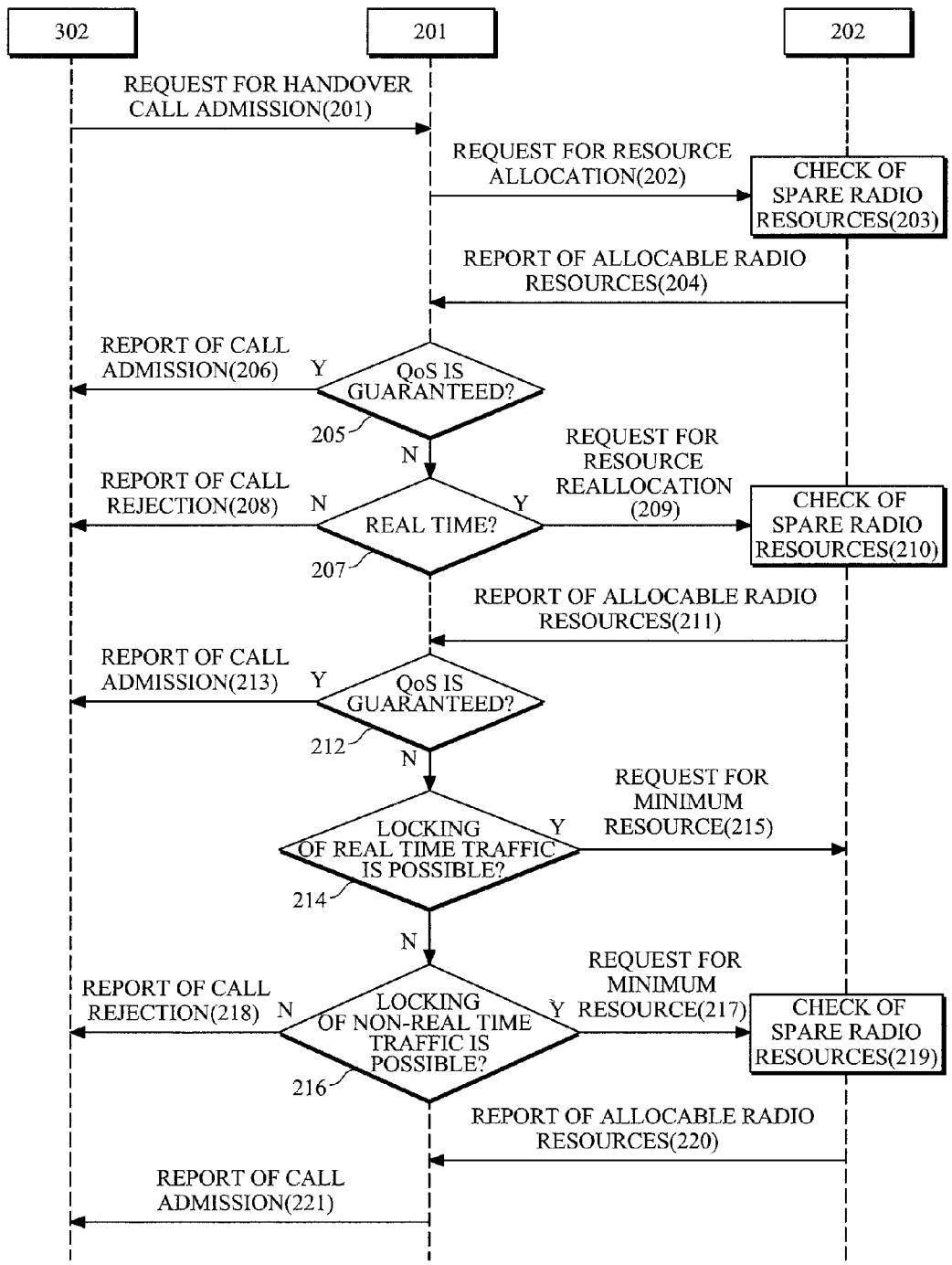
FIG. 3 is a view illustrating another exemplary radio resource management method.

FIG. 3 is a view illustrating another exemplary radio resource management method, in which the exemplary radio resource managing apparatus receives the handover call request and processes the handover call while managing radio resources in response to the handover call request.

First, if the handover call processor 302 receives a call attempt request from a mobile terminal, the handover call processor 301 requests the call admission controller 201 to admit a call by using a call type, a call service classification and QoS as parameters such that an access for a wireless area is set (operation 201).

The call admission controller 201 transmits the call admission request to the load controller 202 to request a resource allocation (operation 202).

The load controller 202 checks a status of spare radio resources in response to the call admission request (operation 203), and provides the call admission controller 201 with information on allocable radio resources (operation 204). For example, the load controller 202 provides the call admission controller 201 with information on a bandwidth available for the resource status.

The call admission controller 201 determines whether QoS is guaranteed based on the information transmitted from the load controller 202 (operation 205). For example, the call admission controller 201 determines the bandwidth is suitable for the present resource status.

Upon the result of determination on the QoS, if the QoS is guaranteed, the call admission controller 201 reports a call admission to the handover call processor 302 (operation 206), and if the QoS is not guaranteed, the call admission controller 201 determines whether the traffic is real time traffic (operation 207).

If the traffic is not real time traffic, the call admission controller 201 reports a call rejection to the handover call processor 302 (operation 208). If the traffic is real time traffic, which is sensitive to a time delay, the call admission controller 201 requests the load controller 202 to reallocate radio resources (operation 209).

The load controller 202 checks a status of spare radio resources (operation 210), and provides the call admission controller 201 with information on allocable radio resources (operation 211).

The call admission controller 201 determines whether QoS is guaranteed based on the information on the reallocated radio resources received from the load controller 202 (operation 212).

Upon the result of determination on the QoS, if the QoS is guaranteed, the call admission controller 201 reports a call admission to the handover call processor 302 (operation 213), and if the QoS is not guaranteed, it is determined whether locking is possible (operations 214 and 216). Locking represents a process of finding a condition ensuring a minimum level of QoS while temporally delaying a service. In the case of a handover call, locking of real time traffic may be performed. Accordingly, the locking probability is estimated on both the real time traffic and the non-real time traffic.

That is, it is determined whether locking of real time traffic is possible (operation 214). If the locking of the real time traffic is possible, the call admission controller 201 requests the load controller 202 to allocate radio resources capable of guaranteeing a minimum level of QoS (operation 215). If the locking of the real time traffic is not possible, it is determined whether locking of non-real time traffic is possible (operation 216). If the locking of the non-real time traffic is possible, the call admission controller 201 requests the load controller 202 to allocate radio resources capable of guaranteeing a minimum level of QoS (operation 217). If the QoS of the handover call is not guaranteed and the locking of the both traffic is not possible, the call admission controller 201 reports a call rejection to the handover processor 302 (operation 208).

If the locking of the real time traffic or the non-real time traffic is possible, the load controller 202 checks spare radio resources (operation 219), allocates radio resources capable of guaranteeing a minimum level of QoS and provides the call admission controller 201 with information on the allocated radio resources (operation 220). The call admission controller 201 reports a call admission to the handover call processor 302 (operation 221).

Since a handover call is more sensitive to service quality as compared with a normal call, the handover call can be provided to a real time service, such as voice or video, and a service insensitive to a time delay, such as e-mail and a web service. In this case, the real time services need to be processed with higher priority. However, if the real time service is not admitted, spare radio resources are allocated to the non-real time services, thereby guaranteeing QoS of a system and improving the performing of the system.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves such as data transmission through the Internet. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains. A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A radio resource managing apparatus for receiving a normal call request or a handover call request and managing radio resources for processing the normal call request or the handover call request and in a mobile communication system, the apparatus comprising:
a call admission controller to determine whether or not to admit the normal call request or the handover call request depending on whether a Quality of Service (QoS) is guaranteed, traffic is real time traffic, or locking of traffic is possible; and
a load controller to allocate the radio resources in response to the normal call request or the handover call request while checking spare radio resources, and to provide the call admission controller with information indicating allocable radio resources,
wherein the call admission controller receives the normal call request or the handover call request, transmits the normal call request or the handover call request to the load controller and estimates whether the QoS is guaranteed based on the information indicating the allocable radio resources,
wherein if the QoS is guaranteed, the call admission controller admits the normal call or the handover call, and if the QoS is not guaranteed, the call admission controller determines whether the traffic is real time traffic,
wherein, if the traffic is real time traffic, the call admission controller requests the load controller to allocate radio resources and estimates whether QoS is guaranteed,
if the QoS is guaranteed, the call admission controller admits the normal call or the handover call, and if the QoS is not guaranteed, determines whether traffic locking is possible, and
if the traffic locking is possible, the call admission controller requests the load controller to allocate radio resources capable of guaranteeing a minimum level of QoS, thereby admitting the normal call or the handover call.

2. A method of managing radio resources in a mobile communication system including a load controller, which allocates the radio resources upon a normal call request or a handover call request and determines whether or not to perform an overload control by using received load relating information, and a call admission controller determining whether or not to admit the normal call request or the handover call request depending on whether a Quality of Service (QoS) is guaranteed on the radio, resources allocated by the load controller, traffic is real time traffic and traffic locking is possible, the method comprising:
at the load controller, if the call admission controller transmits the normal call request or the handover call request to the load controller, checking spare radio resources and providing information about allocable radio resources to the call admission controller;
at the call admission controller, estimating whether the QoS is guaranteed on the allocable radio resources, if the QoS is guaranteed, admitting the normal call or the handover call, and if the QoS is not guaranteed, determining whether the traffic is real time traffic;
at the call admission controller, if the traffic is real time traffic, requesting the load controller to allocate radio resources and then at the load controller, checking spare radio resources and providing information about allocable radio resources to the call admission controller;
at the call admission controller, estimating whether QoS is guaranteed based on the allocable radio resources;
at the call admission controller, if the QoS is guaranteed, admitting the normal call or the handover call, and if the QoS is not guaranteed, determining whether locking is possible; and
at the call admission controller, if the locking is possible, requesting the load controller to allocate radios resources capable of guaranteeing a minimum level of QoS, and at the load controller, allocating the requested radio resources and providing information about the requested radio resources to the call admission controller, and at the call admission controller, admitting the normal call or the handover call based on the information.

3. The method of claim 2, wherein, when the call admission controller processes the normal call request, the determining of the locking probability includes determining whether locking of non-real time traffic is possible.

4. The method of claim 2, wherein, when the call admission controller processes the handover call request, the determining of the locking probability includes determining whether locking of real-time traffic or non-real time traffic is possible.

* * * * *